(12) United States Patent
Bowen

(10) Patent No.: US 11,936,797 B1
(45) Date of Patent: Mar. 19, 2024

(54) SHORT-DURATION DIGITAL CERTIFICATE ISSUANCE BASED ON LONG-DURATION DIGITAL CERTIFICATE VALIDATION

(71) Applicant: Amazon Technologies, Inc., Seattle, WA (US)

(72) Inventor: Peter Zachary Bowen, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/104,103

(22) Filed: Jan. 31, 2023

Related U.S. Application Data

(63) Continuation of application No. 15/836,581, filed on Dec. 8, 2017, now Pat. No. 11,575,522, which is a continuation of application No. 14/570,867, filed on Dec. 15, 2014, now Pat. No. 9,843,452.

(51) Int. Cl.
*H04L 29/06* (2006.01)
*H04L 9/32* (2006.01)

(52) U.S. Cl.
CPC ............ *H04L 9/3268* (2013.01); *H04L 9/321* (2013.01)

(58) Field of Classification Search
CPC .............................. H04L 9/3268; H04L 9/321
See application file for complete search history.

(56) References Cited

U.S. PATENT DOCUMENTS

| | | | |
|---|---|---|---|
| 5,671,279 A | 9/1997 | Elgamal | |
| 5,872,844 A | 2/1999 | Yacobi | |
| 6,233,341 B1 | 5/2001 | Riggins | |
| 6,763,459 B1 | 7/2004 | Corella | |
| 7,043,441 B1 * | 5/2006 | Maher | G06Q 20/40 705/40 |
| 7,340,600 B1 | 3/2008 | Corella | |

(Continued)

FOREIGN PATENT DOCUMENTS

| | | |
|---|---|---|
| CA | 2795420 A1 | 6/2013 |
| EP | 1117207 A2 | 7/2001 |

(Continued)

OTHER PUBLICATIONS

European Communication pursuant to Article 71(3) EPC for Application No. 19152269.7 dated Sep. 14, 2023, 53 pages.

(Continued)

*Primary Examiner* — John B King
(74) *Attorney, Agent, or Firm* — Davis Wright Tremaine LLP

(57) ABSTRACT

A certificate authority service receives a request to issue a short-duration digital certificate usable for authentication of a server of an entity. The request includes a long-duration digital certificate that is not usable for authentication of the server of the entity, the long-duration certificate being usable for validation purposes between the entity and the service. The service determines whether to issue the short-duration digital certificate based on a validity period that is specified in the long-duration digital certificate. Based on the determination, the service issues the short-duration digital certificate that includes a shorter validity period than the long-duration digital certificate. The short-duration digital certificate may enable a client to authenticate the entity and securely communicate with the entity.

20 Claims, 10 Drawing Sheets

(56) References Cited

U.S. PATENT DOCUMENTS

| | | | |
|---|---|---|---|
| 7,461,250 | B1 | 12/2008 | Duane et al. |
| 8,015,399 | B2 | 9/2011 | Imai |
| 8,843,740 | B2 | 9/2014 | Brown et al. |
| 8,935,524 | B1 | 1/2015 | Lawrence |
| 9,614,833 | B1 | 4/2017 | Rao |
| 9,754,253 | B1 * | 9/2017 | Brandwine .......... G06Q 20/382 |
| 2001/0032310 | A1 | 10/2001 | Corella |
| 2002/0062438 | A1 | 5/2002 | Asay et al. |
| 2003/0046544 | A1 | 3/2003 | Roskind et al. |
| 2005/0138364 | A1 | 6/2005 | Roskind et al. |
| 2008/0065880 | A1 | 3/2008 | Martin |
| 2008/0133414 | A1 | 6/2008 | Qin et al. |
| 2009/0228703 | A1 | 9/2009 | Grajek et al. |
| 2010/0268942 | A1 | 10/2010 | Hernandez-Ardieta et al. |
| 2011/0154027 | A1 | 6/2011 | Liu et al. |
| 2012/0233458 | A1 | 9/2012 | Sugano |
| 2013/0145151 | A1 | 6/2013 | Brown et al. |
| 2013/0145155 | A1 | 6/2013 | Liu et al. |
| 2013/0238895 | A1 | 9/2013 | Dixon et al. |
| 2013/0254535 | A1 | 9/2013 | Akehurst et al. |
| 2015/0180861 | A1 | 6/2015 | Omori et al. |
| 2016/0127354 | A1 | 5/2016 | Borchardt et al. |
| 2018/0262346 | A1 | 9/2018 | Levy et al. |

FOREIGN PATENT DOCUMENTS

| | | | |
|---|---|---|---|
| JP | 2004304710 | A | 10/2004 |
| JP | 2005129066 | A | 5/2005 |
| JP | 2007206961 | A | 8/2007 |
| JP | 2008022526 | | 1/2008 |
| JP | 2010081154 | | 4/2010 |
| JP | 2011160383 | | 8/2011 |
| JP | 2014207510 | | 10/2014 |
| KR | 20060096979 | A | 9/2006 |
| KR | 20090120047 | A | 11/2009 |
| WO | 2007099608 | A1 | 9/2007 |

OTHER PUBLICATIONS

Australian First Examination Report dated Dec. 1, 2017, for Patent Application No. 2015384754, 3 pages.
Canadian Office Action for Patent Application No. 2,969,237 dated Mar. 20, 2018, 12 pages.
Carbonell et al., "Secure Multiparty Payment with an Intermediary Entity," Science Direct, Computers & Security, 2009, 12 pages.
Chinese First Office Action, dated Jul. 2, 2019, for Patent Application No. 21580066378.4, 27 pages.
Chinese Notice to Grant for Patent Application No. 201580066378.4 dated Sep. 3, 2020, 6 pages.
Chinese Second Office Action for Patent Application No. 201580066378.4 dated Apr. 1, 2020, 10 pages.
Cooper et al., "Internet X.509 Public Key Infrastructure Certificate and Certificate Revocation List (CRL) Profile," Network Working Group, May 1, 2008, 151 pages.
European 94(3) Communication for Patent Application No. 19152269.7 dated Nov. 13, 2020, 4 pages.
European Communication pursuant to Article 94(3) EPC for Application No. 19152269.7 dated Apr. 17, 2020, 4 pages.
European Communication Pursuant to Article 94(3) for Patent Application No. 19152269.7 dated Jan. 13, 2022, 4 pages.
European Communication Rule 69, dated Jun. 17, 2019, for Patent Application No. 19152269.7, 2 pages.
European Extended Search Report, dated May 13, 2019, for Patent Application No. 19152269.7, 8 pages.
India First Examination Report for Patent Application No. 201717019902 dated May 21, 2020, 5 pages.
International Search Report and Written Opinion mailed Sep. 21, 2016, International Patent Application No. PCT/US2015/065634, filed Dec. 14, 2015.
Japanese Decision for Grant, dated Apr. 23, 2019, for Patent Application No. 2017-529776, 3 pages.
Japanese Decision on Rejection for Patent Application No. 2019-096699 dated Sep. 7, 2021, 4 pages.
Japanese Examination Report for Patent Application No. 2019-096699 dated Mar. 23, 2022, 4 pages.
Japanese Notice of Reasons for Refusal for Patent Application No. 2019-096699 dated Jun. 9, 2020, 10 pages.
Japanese Notice of Reasons for Rejection for Patent Application No. 2019-096699 dated Feb. 2, 2021, 5 pages.
Japanese Notice of Reasons for Rejection for Patent Application No. 2022-001322 dated Apr. 11, 2023, 2 pages.
Korean Final Rejection for Patent Application No. 10-2020-7032059 dated Mar. 24, 2022, 8 pages.
Korean Intellectual Property Office, "Notice of Allowance" in application No. 10-2020-7032059, dated Jul. 6, 2022, 2 pages.
Korean Notice of Allowance for Patent Application No. 10-2019-7035958 dated Aug. 6, 2020, 4 pages.
Korean Preliminary Rejection for Patent Application No. 10-2019-7035958 dated Jan. 7, 2020, 9 pages.
Korean Preliminary Rejection for Patent Application No. 10-2020-7032059 dated Dec. 18, 2020, 5 pages.
Korean Preliminary Rejection for Patent Application No. 10-2020-7032059 dated Jun. 23, 2021, 10 pages.
Masdari, et al., "A Survey and Taxonomy of Distributed Certificate Authorities in Mobile Ad Hoc Networks." EURASIP journal on wireless communications and networking 2011.1 (2011): 1-12. Web (Year:2011).
Menezes et al., Handbook of Applied Cryptography, CRC Press, 1997, ISBN 0-8493-8523-7, 794 pages.
Papadimitratos et al., "Secure Vehicular Communication Systems: Design and Architecture," IEEE Communications Magazine, Nov. 25, 2008, 46(11):100-109.
Singapore Notice of Eligibility for Grant and Supplementary Examination Report for Patent Applicaiton No. 11201704594T, 5 pages.

* cited by examiner

SHORT-DURATION DIGITAL CERTIFICATE ISSUANCE BASED ON LONG-DURATION DIGITAL CERTIFICATE VALIDATION

CROSS-REFERENCE TO RELATED APPLICATION

This application is a continuation of U.S. patent application Ser. No. 15/836,581, filed Dec. 8, 2017, entitled "SHORT-DURATION DIGITAL CERTIFICATE ISSUANCE BASED ON LONG-DURATION DIGITAL CERTIFICATE VALIDATION," which is a continuation of U.S. patent application Ser. No. 14/570,867, now U.S. Pat. No. 9,843,452, filed Dec. 15, 2014, entitled "SHORT-DURATION DIGITAL CERTIFICATE ISSUANCE BASED ON LONG-DURATION DIGITAL CERTIFICATE VALIDATION," the disclosure of which is incorporated herein by reference in its entirety.

BACKGROUND

A certificate authority generally issues digital certificates to customers to enable these customers to establish secure communications with other entities and allow these other entities to authenticate these customers. In order to issue a digital certificate to a customer, the certificate authority may need to validate information regarding the customer by examining government databases, third-party databases and services, and other customer techniques. If the information regarding the customer can be validated by the certificate authority, the certificate authority may generate and issue the digital certificate to the customer. However, such validation techniques may be a time and resource extensive activity. Thus, requests for multiple digital certificates may not be desirable, as the expense and time required to obtain these digital certificates may be significant.

BRIEF DESCRIPTION OF THE DRAWINGS

Various embodiments in accordance with the present disclosure will be described with reference to the drawings, in which.

DETAILED DESCRIPTION

Figure 1:
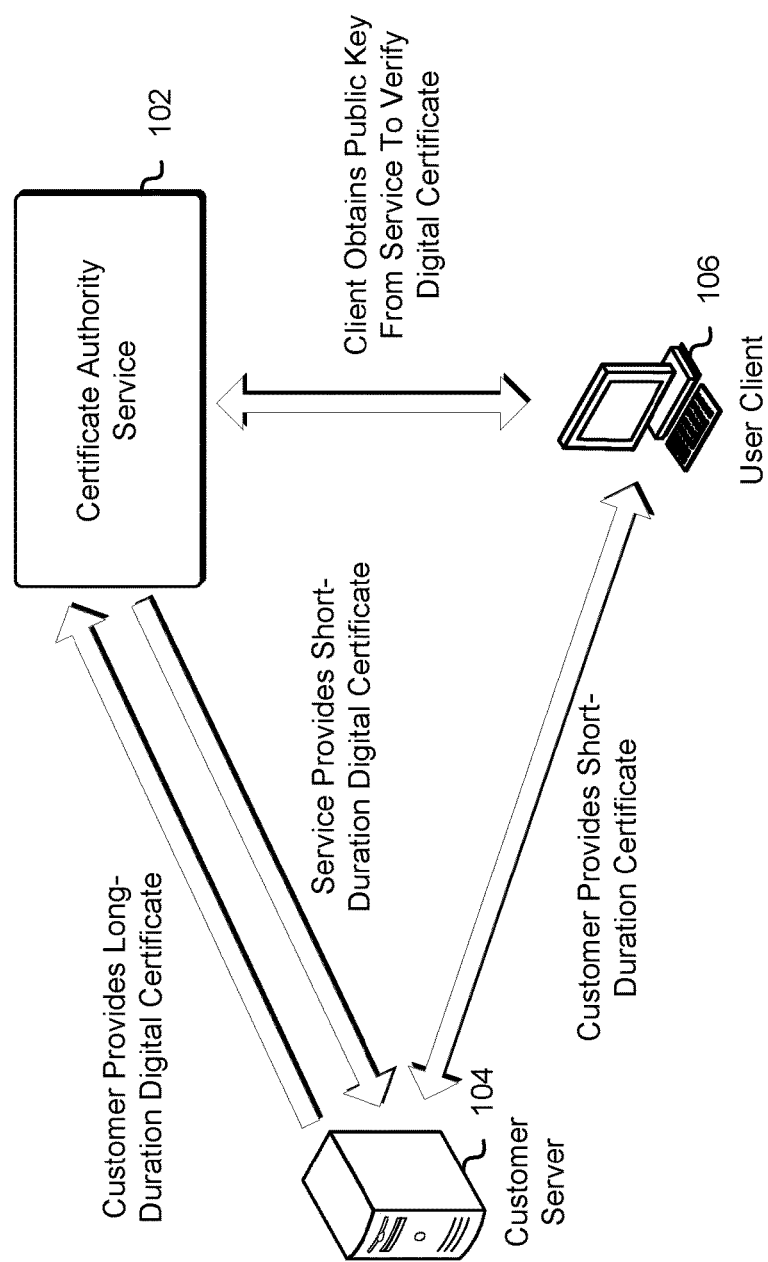
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the issuance of a long-duration certificate which may be utilized to request and obtain short-duration digital certificates for server authentication. In an embodiment, an entity (e.g., a computing device of an organization) communicates with a certificate authority service, such as through one or more application programming interface (API) calls to the service, to request issuance of a long-duration digital certificate. The entity may be associated with a customer of the certificate authority service, which may be configured to issue digital certificates to various customers to enable these various customers to establish secure communications channels with other entities and allow these other entities to authenticate these various customers through use of the issued digital certificates. The long-duration digital certificate may be issued with a long validation period (e.g., one year or greater) and may include an extension which may be marked as critical. This critical extension may prevent user clients (e.g., browser applications installed on a user computing device) from accepting this long-duration digital certificate, as these user clients may either not be configured to recognize the critical extension or are configured to reject this critical extension.

Once the certificate authority service has validated the entity to ensure that a long-duration digital certificate may be issued to the entity, the certificate authority service may issue this long-duration certificate to the entity or the entity's servers. Upon receipt of the long-duration digital certificate, the entity may request short-duration digital certificates, which may be utilized to establish a secure communications channel with a user client. For instance, in an embodiment, the certificate authority service receives, from the entity, the long-duration digital certificate and a request for issuance of a short-duration digital certificate. The certificate authority service may verify information specified within the long-duration digital certificate to authenticate the entity and, upon verification, issue a short-duration digital certificate to the entity. The short-duration digital certificate may have a shorter validation period in relation to the long-duration digital certificate (e.g., a few days, a few months, etc.). Further, the certificate authority service may determine this validation period based on the remaining validation period of the long-duration digital certificate. For example, if the remaining validation period for the long-duration digital certificate is three months, the certificate authority service may issue a short-duration digital certificate with a validation period that does not exceed three months.

In an embodiment, once the entity has obtained the short-duration digital certificate from the certificate authority service, the entity may provide this short-duration digital certificate to a user client in order to establish a secure communications channel. The user client, upon receipt of the short-duration digital certificate, may verify the identity of the entity through evaluation of the short-duration digital certificate and, through use of a public cryptographic key obtained from the certificate authority service, verify the digital signature included within the short-duration digital certificate. This may enable the user client to verify that the short-duration digital certificate was issued by the certificate authority service and is thus valid. Utilizing this short-duration digital certificate, the user client may obtain the public cryptographic key of the entity and utilize this public cryptographic key to encrypt and transmit data to the entity through the secure communications channel.

In this manner, an entity may be able to obtain multiple short-duration digital certificates from a certificate authority service based on a previously issued long-duration digital certificate without the need for extensive validation processes being performed prior to issuance of each short-duration digital certificate. In addition, the techniques described and suggested herein facilitate additional technical advantages. For example, because, in some embodiments, the long-duration digital certificate includes an extension that is either unrecognizable and/or causes a user client to reject the long-duration digital certificate, an entity may no longer be required to revoke and request issuance of a new long-duration digital certificate in the event the long-duration digital certificate is compromised. Further, if a short-duration digital certificate is compromised, the entity may revoke this short-duration digital certificate and utilize the issued long-duration digital certificate to obtain a new short-duration digital certificate from the certificate authority service without need to go through the entire validation process once more.

FIG. 1 shows an illustrative example of an environment 100 in which various embodiments can be implemented. In the environment 100, a certificate authority service 102 may provide a certificate authority system that enables customers of the certificate authority service 102 to request issuance of one or more digital certificates, which may certify the ownership of a public cryptographic key by a customer (e.g., named subject, as identified within the digital certificate). These one or more digital certificates may allow other entities, such as a user client 106 (e.g., browser applications) to verify the identity of the customer and establish a secure communications channel with the customer, whereby transmissions of encrypted and non-encrypted data may be made. In an embodiment, the certificate authority service 102 receives a request from a customer for a long-duration digital certificate, which may be utilized for issuance of short-duration digital certificates at a later time so long as the long-duration digital certificate is still valid.

The certificate authority service 102, upon receiving the request from the customer for issuance of the long-duration certificate, may perform one or more validation processes to ensure that the customer may be trusted and is authorized to obtain a digital certificate from the certificate authority service 102. For instance, the certificate authority service 102 may access one or more government agencies, third-party databases or any other trusted information repository to evaluate the customer, ensure that the customer is what it claims to be, and that the customer has been properly vetted for a digital certificate. If the customer has been properly vetted by the certificate authority service 102, the certificate authority service 102 may issue a long-duration digital certificate to the customer for use in obtaining shorter term short-duration digital certificates. The long-duration digital certificate, in some embodiments, is an X.509 certificate, which may specify the issuer of the digital certificate, the validity period for the certificate, the subject (e.g., customer), the subject's public cryptographic key, and the digital signature of the certificate authority service 102. However, this long-duration digital certificate may further specify a critical extension that may indicate that the long-duration digital certificate is to be utilized only for validation purposes. This critical extension may not be recognized by some user clients 106 and, as a result, may be automatically rejected by these user clients 106. Alternatively, the user clients 106 may be configured to reject any digital certificates that include this critical extension.

Once the customer has received this long-duration digital certificate from the certificate authority service 102, the customer, through one or more customer servers 104, may submit a request to the certificate authority service 102 to obtain one or more short-duration digital certificates usable to establish a secure communications channel with a user client 106 and enable the user client 106 to authenticate the customer server 104. The request to the certificate authority service 102 may include the aforementioned long-duration digital certificate. Upon receiving the request from the one or more customer servers 104, the certificate authority service 102 may evaluate the long-duration digital certificate to verify the identity of the customer and ensure that the long-duration digital certificate is still valid. In an embodiment, the request may be digitally signed using the customer's private cryptographic key corresponding to a public cryptographic key specified within the long-duration digital certificate to assure the certificate authority service 102 that it is issuing the one or more short-duration digital certificates to the same entity that the certificate authority service 102 originally issued the long-duration digital certificate to. The certificate authority service 102 may use the public cryptographic key of the long-duration digital certificate to verify the digital signature.

The certificate authority service 102, upon verifying the identity of the customer that has provided the request, may evaluate the long-duration digital certificate to determine the remaining validation period for this digital certificate. The certificate authority service 102 may utilize this information to establish a validity period that may be specified within the one or more short-duration digital certificates. For instance, if the remaining validation period for the long-duration digital certificate is three months, the certificate authority service 102 may issue a short-duration digital certificate that has a validation period that does not exceed the remaining three-month period defined in the long-duration digital certificate. Alternatively, a customer, through the request, may specify a desired validation period for the short-duration digital certificate, so long as the desired validation period does not exceed the remaining validation period of the provided long-duration digital certificate.

The certificate authority service 102 may also generate the short-duration digital certificate to include the same public cryptographic key specified within the long-duration digital certificate. This may enable the short-duration digital certificate to serve as a proxy for the long-duration digital certificate and enable access to the user client 106 or other entity. For instance, the long-duration digital certificate may be issued to the customer through a physical implement, such as a smart card, badge or other device that may have stored within it the long-duration digital certificate. A customer may present the smart card, badge or other device to the certificate authority service 102 through a computing device at a remote location. Based at least in part on the analysis of the long-duration digital certificate within the smart card or other device, the customer may be issued with a short-duration digital certificate that may be valid for a shorter period of time. This may enable the customer to access the remote location utilizing this newly issued short-duration digital certificate, which may be valid only during his/her time at this remote location. In an alternative embodiment, the short-duration digital certificate may further specify a different customer cryptographic key than the one specified within the long-duration digital certificate. This may enable the customer to revoke the short-duration digital certificate if compromised without exposing the customer cryptographic key specified within the long-duration digital certificate.

Once the customer, through the one or more customer servers 104, has received the one or more short-duration digital certificates from the certificate authority service 102, the customer servers 104 may now transmit data to one or more user clients 106 along with the received one or more short-duration digital certificates. The user client 106 may obtain, from the certificate authority service 102, a public cryptographic key of a cryptographic key pair which may be used to verify the certificate authority service's 102 digital signature specified within the one or more short-duration digital certificates. If the certificate authority service's 102 digital signature is verified to be authentic, the user client 106 may determine that the one or more short-duration digital certificates are valid and thus use these to verify the identity of the one or more customer servers 104 and, if verified, utilize the customer's public cryptographic key specified within the short-duration digital certificates. For instance, if the customer servers 104 are utilized to transmit digitally signed (e.g., utilizing a customer's private cryptographic key) data to the user client 106, the user client 106 may utilize the customer's public cryptographic key as specified within the short-duration digital certificate to verify the customer's digital signature and determine whether the transmitted data is valid. Thus, the user client 106 may be utilized to transmit information to the customer servers 104 securely.

Figure 2:
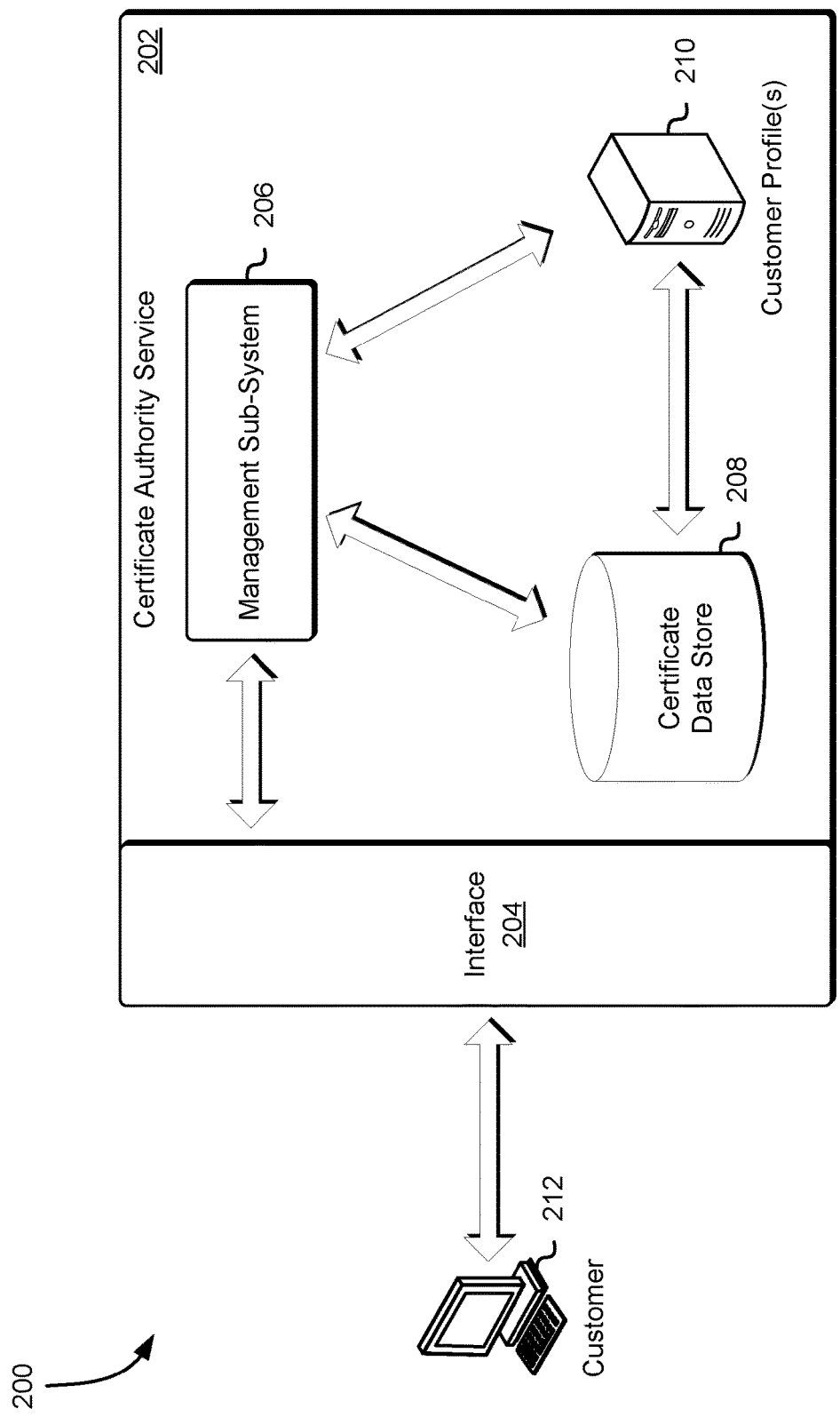
FIG. 2 shows an illustrative example of an environment in which various components of a certificate authority service are collectively configured to issue long-duration digital certificates and short-duration digital certificates to a customer in accordance with at least one embodiment.

As noted above, a customer may communicate with a certificate authority service to request issuance of a long-duration digital certificate that may be utilized for validation purposes in obtaining short-duration digital certificates. Further, the customer, through one or more customer servers, may request, from the certificate authority service these short-duration digital certificates, which may then be used to enable user clients to authenticate the one or more customer servers. The request for these short-duration digital certificates may include the long-duration digital certificate, which the certificate authority service may utilize to authenticate the customer. Accordingly, FIG. 2 shows an illustrative example of an environment 200 in which various components of a certificate authority service 202 are collectively configured to issue long-duration digital certificates and short-duration digital certificates to a customer 212 in accordance with at least one embodiment.

The certificate authority service 202 may provide customers 212 with an interface 204 that may enable these customers 212 to access the certificate authority service 202. A customer 212 may utilize the interface 204 through one or more communications networks, such as the Internet. The interface 204 may comprise certain security safeguards to ensure that the customer 212 has authorization to access the certificate authority service 202. For instance, in order to access the certificate authority service 202, a customer may need to provide a username and a corresponding password or encryption key when using the interface 204. Additionally, requests (e.g., API calls) submitted to the interface 204 may require an electronic signature generated using a cryptographic key such that the electronic signature is verifiable by the certificate authority service 202, such as by an authorization system (not shown).

Through the interface 204, the customer 212 may be able to submit a request for issuance of a long-duration digital certificate to one or more customer 212 servers. As noted above, the long-duration digital certificate may be utilized, at a later time, to enable the certificate authority service 202 to authenticate the customer 212 and issue short-duration digital certificates to the customer 212 servers. The request for issuance of the long-duration digital certificate may include information regarding the customer 212, such as the customer's 212 name, address, earnings information, and the like. Further, through the interface 204, a customer 212 may be permitted to specify the validation period for the long-duration digital certificate, which may then be specified within the long-duration digital certificate.

Once the certificate authority service 202 has received the customer's 212 request for issuance of a long-duration digital certificate, the interface 204 may transmit the request to a management sub-system 206, which may be configured to process the request and determine whether the customer 212 may be issued a long-duration digital certificate. For instance, the management sub-system 206 may be configured to access government agency databases and other third-party databases to determine, based at least in part on customer 212 information provided with the request, whether the customer 212 may be issued a long-duration digital certificate. For example, if the management sub-system 206 determines, based at least in part on information specified within a third-party database, that the customer 212 cannot be trusted, the management sub-system 206 may deny the customer's 212 request for a long-duration digital certificate. If the management sub-system 206 determines that the customer 212 may be issued a long-duration digital certificate, the management sub-system 206 may store the customer's 212 information within a customer profile repository 210. Further, the management sub-system 206 may access a certificate data store 208 to obtain a certificate template that may be utilized to generate the long-duration digital certificate. For instance, the management sub-system 206 may obtain an X.509 digital certificate template from the certificate data store 208 and utilize this template to generate a long-duration X.509 digital certificate for the customer 212. The management sub-system 206, through the interface 204, may provide the customer 212 with the newly generated long-duration digital certificate.

In an embodiment, the management sub-system 206 specifies, within the long-duration digital certificate, a critical extension that may not be recognizable by a user client or may be rejected by the user client. For instance, the critical extension may be a "validation-only" extension that may signal, to a user client, that the digital certificate may not be utilized for authenticating a customer 212. This critical extension may include information on the one or more validations performed to authenticate the customer 212, such as the date the validation was performed, the standards or requirements which were used for customer 212 validation, and/or an identifier of the customer 212 of the certificate authority service 202 for whom the validation was performed.

At a later time, the customer 212, through one or more customer 212 servers, may again access the interface 204 to request creation of one or more short-duration digital certificates, which may be used to establish a secure communications channel with a user client and enable the user client to authenticate the customer 212. The request may include the long-duration digital certificate previously issued to the customer 212. Further, in some embodiments, the request may be digitally signed by the customer 212 using the customer's 212 private cryptographic key, which may correspond to a public cryptographic key specified within the original long-duration digital certificate. Upon receipt of the request, the management sub-system 206 may evaluate the long-duration digital certificate to determine the remaining validation period for the long-duration digital certificate. For instance, the long-duration digital certificate may include a validity period field specifying the start data and expiration date for the long-duration digital certificate. Based at least in part on the specified expiration date, the management sub-system 206 may be able to calculate the remaining validation period for the long-duration digital certificate.

Additionally, if the request has been digitally signed by the customer 212, the management sub-system 206 may access the customer profile repository 210 to obtain a cryptographic key corresponding to this particular customer 212 that may be used to verify the digital signature included with the request and ensure that the received request is valid. If the management sub-system 206 determines, based at least in part on information specified within the long-duration digital certificate, that the customer 212 is what it purports to be, the management sub-system 206 may access the certificate data store 208 to obtain a digital certificate template which may be used to generate the requested one or more short-duration digital certificates. The one or more short-duration digital certificates may be similar to the long-duration digital certificate with the exception of certain specified information. For instance, the short-duration digital specification may specify a validity period that less than or equal to the remaining validation period for the long-duration digital certificate. For instance, if the remaining validation period for the long-duration digital certificate is three months, the management sub-system 206 may specify, within the short-duration digital certificate, that the validity period for the short-duration digital certificate is any value less than or equal to three months. The expiry date for the short-duration digital certificate may thus either coincide with the expiry date of the long-duration digital certificate or be sooner than the expiry date of the long-duration digital certificate.

Further, the short-duration digital certificate may not include the critical extension specified within the long-duration digital certificate. This may enable user clients to utilize the short-duration digital certificate to authenticate the customer 212 and enable user clients to communicate securely with the customer 212. In some embodiments, the management sub-system 206 may generate a short-duration digital certificate that specifies an alternative customer 212 cryptographic key to the cryptographic key specified within the original, long-duration digital certificate. This may help reduce the likelihood that the long-duration digital certificate and, thus, the original customer 212 cryptographic key, may become compromised as a result of a short-term digital certificate breach.

Once the management sub-system 206 has generated the one or more short-duration digital certificates in response to the customer 212 request, the management sub-system 206 may access the customer's 212 profile within the customer profile repository 210 to specify the number of short-duration digital certificates issued, the corresponding customer 212 cryptographic keys, and any other information that may be useful in generating digital certificates on behalf of the customer 212 at a later time. The management sub-system 206, through the interface 204, may issue these short-duration digital certificates to the customer 212, who may provide these short-duration digital certificates to user clients to enable these user clients to authenticate the customer 212 and transmit data securely over a secure communications channel to the customer 212. Further, these short-duration digital certificates may enable the customer 212 to digitally sign his/her data and encrypt data that is to be transmitted to the user clients.

Figure 3:
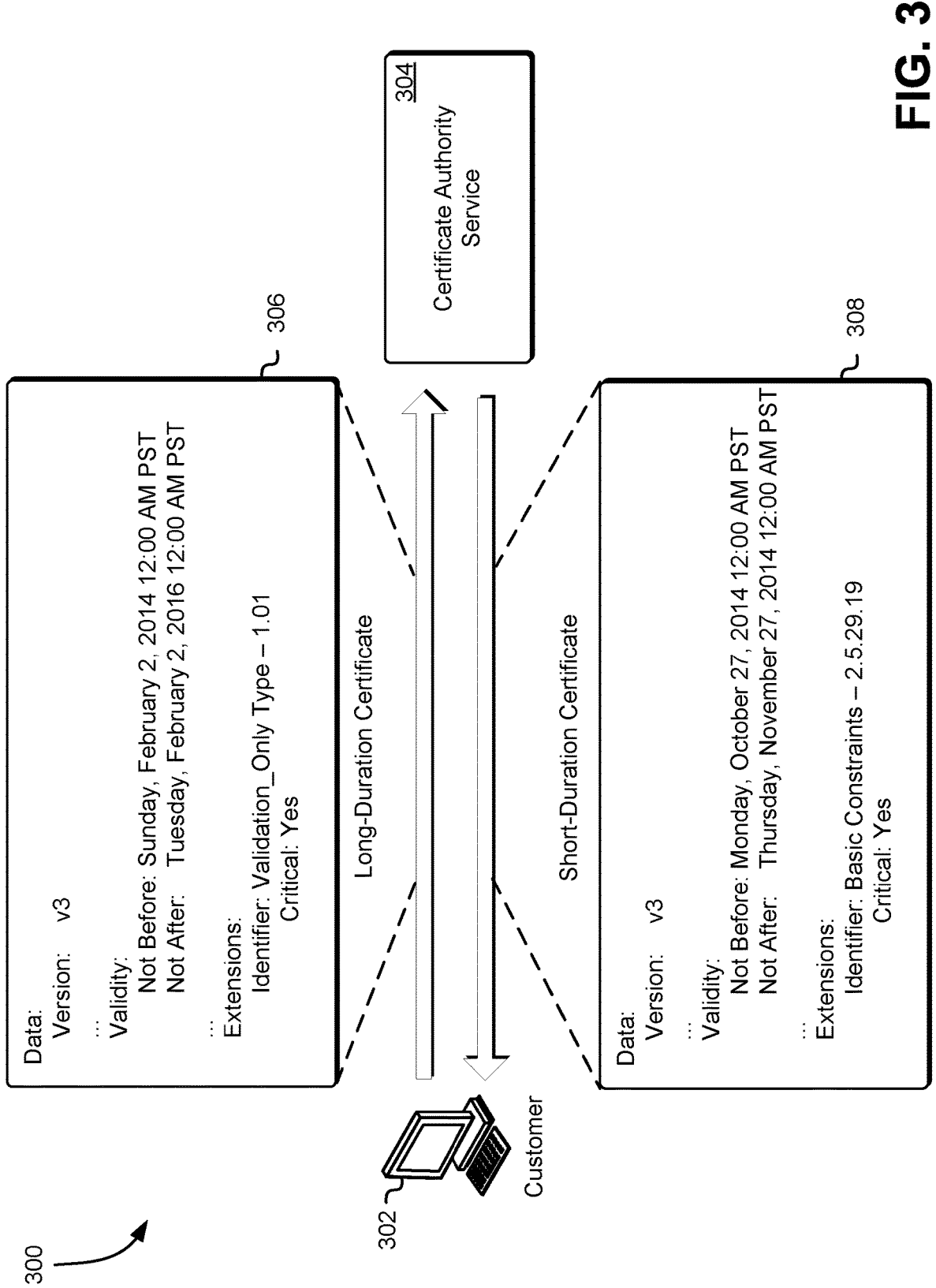
FIG. 3 shows an illustrative example of an environment in which a certificate authority service issues a short-duration digital certificate to a customer upon receipt of a valid long-duration digital certificate in accordance with at least one embodiment.

As noted above, a customer may transmit a request including a previously issued long-duration digital certificate to a certificate authority service to obtain one or more short-duration digital certificates that may be transmitted to user clients such that these user clients may utilize the short-duration digital certificates to authenticate the customer. Accordingly, FIG. 3 shows an illustrative example of an environment 300 in which a certificate authority service 304 issues a short-duration digital certificate 308 to a customer 302 upon receipt of a valid long-duration digital certificate 306 in accordance with at least one embodiment. In the environment 300, a customer 302, as part of the request to the certificate authority service 304 for issuance of one or more short-duration digital certificates 308, may provide a long-duration digital certificate 306 previously issued by the certificate authority service 304 to the customer 302. As noted above, the long-duration digital certificate 306 may specify a validity period, which may include a start date (e.g., "Not Before" field, as illustrated in FIG. 3) and an expiry date (e.g., "Not After" field, as illustrated in FIG. 3). This validity period may define the duration for which the long-duration digital certificate 306 is valid. Further, this validity period may enable the certificate authority service 304 to determine the remaining validation period for the long-duration digital certificate 306. For instance, the certificate authority service 304 may utilize the expiry date and the current date and time to calculate the remaining validation period for the long-duration digital certificate 306.

The long-duration digital certificate 306 may also include a critical extension that may be utilized to prevent user clients from using the long-duration digital certificate 306 for authenticating the customer 302. For instance, as illustrated in FIG. 3, the long-duration digital certificate 306 may specify an extension with an identifier "Validation_Only Type-1.01." This particular extension may be marked as critical, meaning that the user client must reject the long-duration digital certificate 306 if it does not recognize the critical extension. Further, as user clients are updated to recognize this critical extension, the user clients may be configured to not accept any long-duration digital certificates 306 that include this critical extension. Thus, a customer 302 may not be able to assert its identity to a user client simply utilizing this long-duration digital certificate 306.

As noted above, when the customer 302 submits a request to the certificate authority service 304 to obtain one or more short-duration digital certificates 308, the customer 302 may provide the certificate authority service 304 with the previously issued long-duration digital certificate 306. The certificate authority service 304 may evaluate the long-duration digital certificate 306 to ensure that the long-duration digital certificate 306 is still valid. Further, the certificate authority service 304 may evaluate one or more subject fields (not shown) to verify that the customer 302 is what it purports to be. For instance, the one or more subject fields may specify the given name and surname of the customer 302, the customer's 302 organization name and/or unit, the state, province and country where the organization may be located, a common name (e.g., URL) for the customer 302 or other entity, and the like. In an embodiment, the customer 302 utilizes the cryptographic key included within the long-duration digital certificate 306 to digitally sign the request to the certificate authority service 304 in order to assure the certificate authority service 304 that the short-duration digital certificates 308 are going to be issued to the same customer 302 that was issued the long-duration digital certificate 306.

Once the certificate authority service 304 has authenticated the customer 302 through use of the long-duration digital certificate 306, the certificate authority service 304 may generate and issue one or more short-duration digital certificates 308 to the customer 302. These one or more short-duration digital certificates 308 may be similar to the long-duration digital certificate 306 except for a few alternate entries. For instance, as illustrated in FIG. 3, the validity period for the short-duration digital certificate 308 is shorter than the validity period specified within the long-duration digital certificate 306. For example, the certificate authority service 304 may specify a start date equal to the date in which the short-duration digital certificate 308 was generated. Alternatively, the start date for the short-duration digital certificate 308 may be defined as a later date from the date of issuance of the short-duration digital certificate 308 to the customer 302 and prior to the expiry date specified within the long-duration digital certificate 306.

In an embodiment, the short-duration digital certificate 308 is generated to include at least one subject field specific to the customer 302 or other entity specified within the same subject field of the long-duration digital certificate 306. For instance, the short-duration digital certificate 308 may specify the same organization name, organization location (e.g., state, province, country), and common name (e.g., URL) as those specified within the long-duration digital certificate 306. In some embodiments, the short-duration digital certificate 308 may further include additional subject fields not specified within the long-duration digital certificate 306. For instance, the short-duration digital certificate 308 may specify, through one or more of these additional subject fields, an identity of a delegated entity associated with the customer 302 for whom the short-duration digital certificate 308 has been generated. Additionally, the one or more additional subject fields included within the short-duration digital certificate 308 may specify a second location (e.g., state, province, country) wherein the short-duration digital certificate 308 may be utilized.

The expiry date of the short-duration digital certificate 308 may be defined by the certificate authority service 304 based at least in part on the expiry date specified within the long-duration digital certificate 306 and/or customer 302 request. For instance, as illustrated in FIG. 3, the expiry date specified within the short-duration digital certificate 308 is earlier than the expiry data specified within the long-duration digital certificate 306. The validity period for the short-duration digital certificate 308 may be defined by the certificate authority service 304 or by the customer 302 through the request, so long as the validity period for the short-duration digital certificate 308 does not exceed the remaining validation period for the long-duration digital certificate 306.

The short-duration digital certificate 308 may not include the critical extension included within the long-duration digital certificate 306 that prevents use of the digital certificate by user clients. For instance, as illustrated in FIG. 3, the short-duration digital certificate 308 does not include the extension "Validation_Only Type-1.01." Instead, the extensions specified within the short-duration digital certificate 308 may enable user clients to utilize the short-duration digital certificate 308 to authenticate the customer 302 and for other purposes (e.g., data validation, data decryption, etc.). When the short-duration digital certificate 308 expires, the customer 302 may again submit a request to the certificate authority service 304, along with the long-duration digital certificate 306, to obtain new short-duration digital certificate 306.

Figure 4:
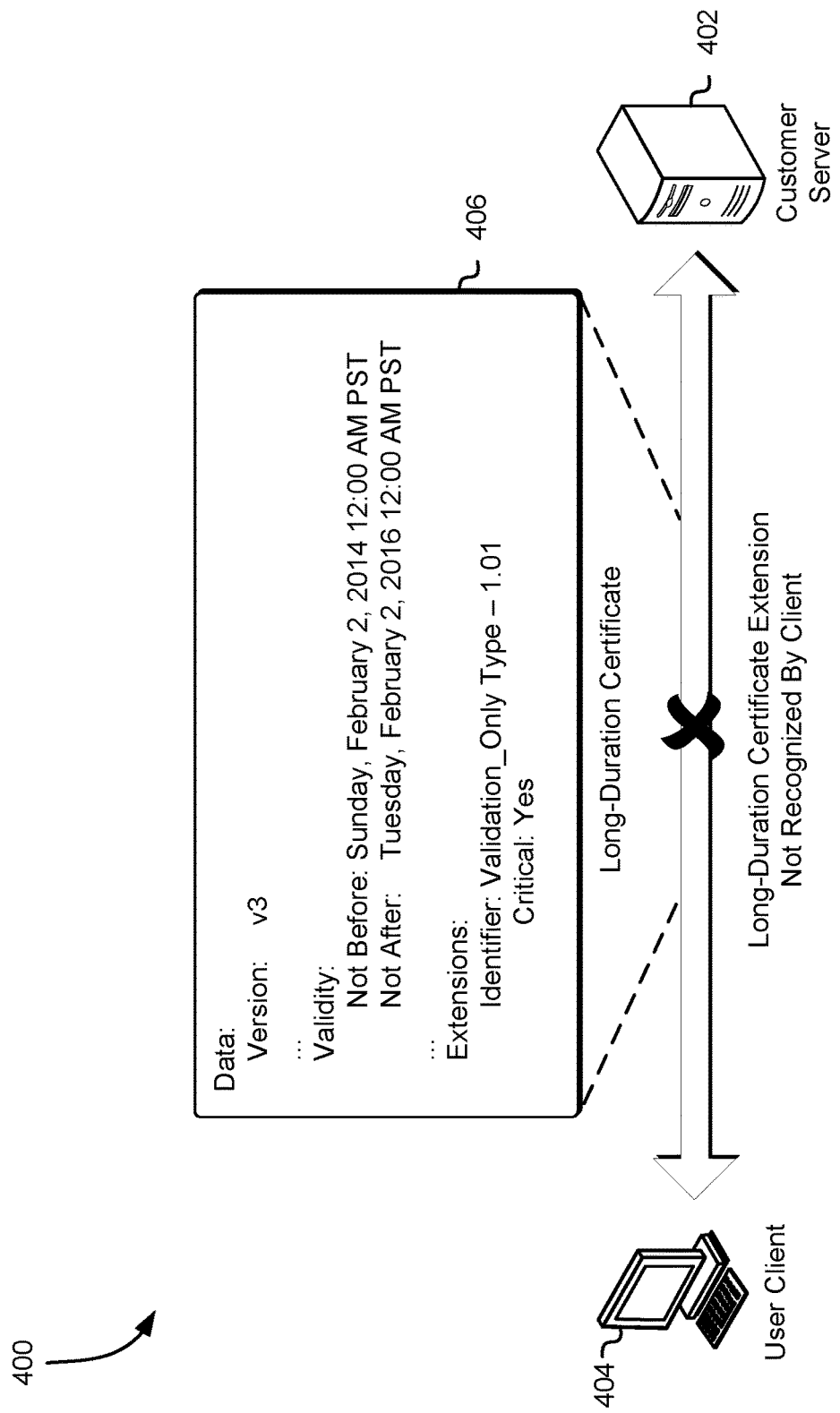
FIG. 4 shows an illustrative example of an environment in which a user client rejects a long-duration digital certificate received from a customer server in accordance with at least one embodiment.

As noted above, long-duration digital certificates issued by a certificate authority service to a customer may not be utilized to verify the authenticity of a customer's assertion of his/her identity. For instance, the long-duration digital certificate may include critical extensions that may not be recognized by one or more user clients or may indicate to these one or more user clients that the long-duration digital certificate may not be accepted for customer authentication. Accordingly, FIG. 4 shows an illustrative example of an environment 400 in which a user client 404 rejects a long-duration digital certificate 406 received from a customer server 402 in accordance with at least one embodiment.

The long-duration digital certificate 406 may include many of the similar fields included in regular digital certificates. For instance, the long-duration digital certificate 406 may specify the validity period for the certificate, the customer to whom the long-duration digital certificate 406 was issued, a customer cryptographic key, and a certificate authority service digital signature, which may be used to verify that the long-duration digital certificate 406 is valid. However, the long-duration digital certificate 406 may include one or more critical extensions that may be utilized to specify that the long-duration digital certificate 406 is for validation only. For instance, as illustrated in FIG. 4, the long-duration digital certificate 406 may specify an extension with an identifier "Validation_Only Type-1.01." This particular extension may be marked as critical, meaning that the user client 404 must reject the long-duration digital certificate 406 if it does not recognize the critical extension. Further, as user clients 404 are updated to recognize this critical extension, the user clients 404 may be configured to not accept any long-duration digital certificates 406 that include this critical extension.

If the user client 404 receives this long-duration digital certificate 406 from a customer server 402, the user client 404 may discard the received data from the customer server 402 and terminate the communications channel with the customer server 402. Thus, customers may only be permitted to utilize the long-duration digital certificate 406 for validation purposes in conjunction with the certificate authority service. Further, this may limit the exposure of the long-duration digital certificate 406 to a wide audience, thereby potentially reducing the risk that the long-duration digital certificate 406 and, hence, the customer's public cryptographic key may be compromised.

Figure 5:
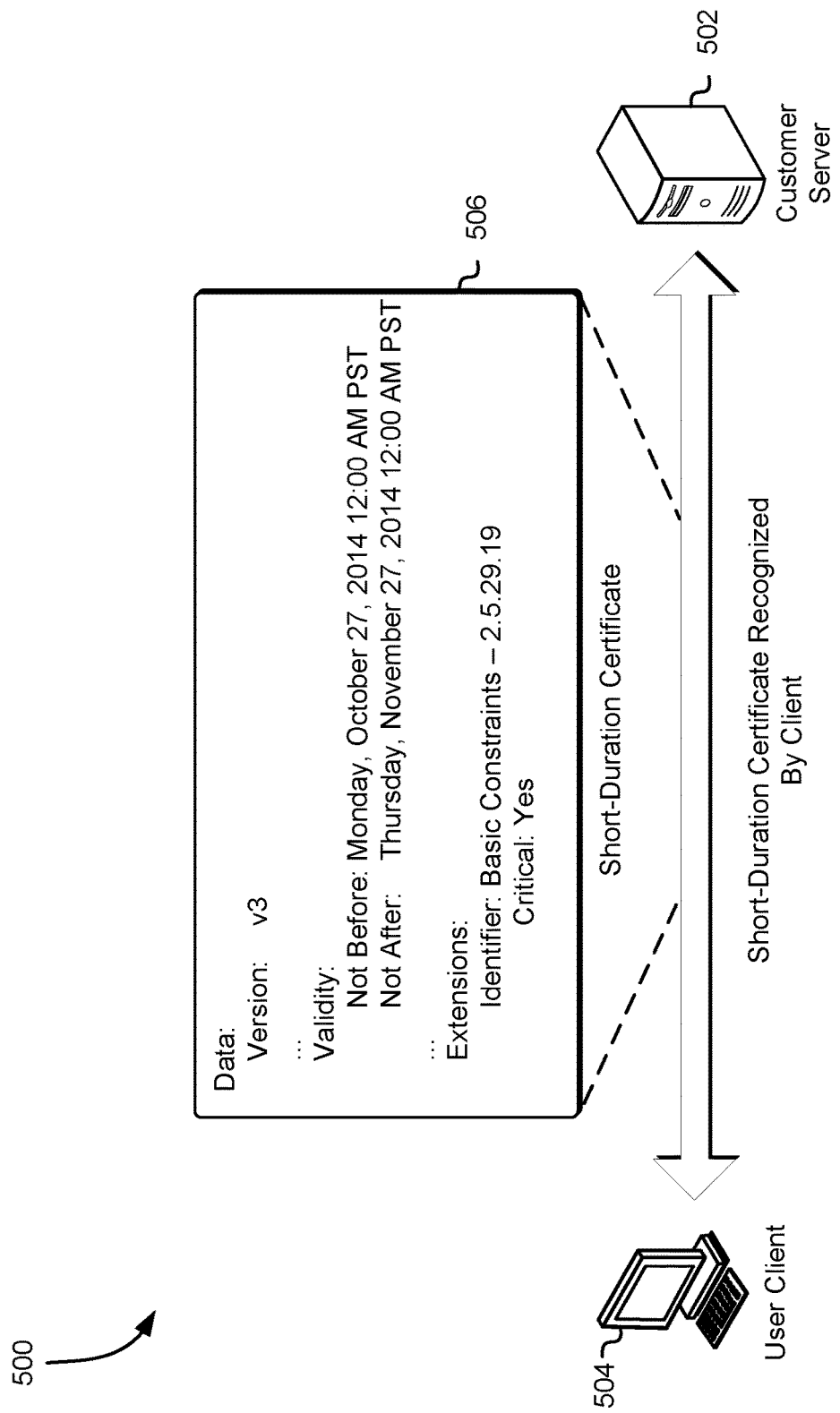
FIG. 5 shows an illustrative example of an environment in which a user client is able to utilize a short-duration digital certificate received from a customer server to authenticate the customer server in accordance with at least one embodiment.

As noted above, a customer, through one or more customer servers, may request one or more short-duration digital certificates from a certificate authority service. The request may include a long-duration digital certificate, which may enable the certificate authority service to authenticate the customer and utilize information specified within the long-duration digital certificate to define the validity period for the one or more short-duration digital certificates to be issued to the customer. These one or more short-duration digital certificates may be utilized by the customer to assert his/her identity to a user client and enable the user client to authenticate the customer. Accordingly, FIG. 5 shows an illustrative example of an environment 500 in which a user client 504 is able to utilize a short-duration digital certificate 506 received from a customer server 502 to authenticate the customer server 502 in accordance with at least one embodiment. The user client 504 and the customer server 502 may be similar to the user client and customer server illustrated in FIG. 4.

In the environment 500, a customer server 502 may transmit data and a short-duration digital certificate 506 to a user client 504. The user client 504 may be a browser application which a user may interact with to access the customer server 502. When the user client 504 initiates communications with the customer server 502, the customer server 502 may respond by providing the user client 504 with certain data and the short-duration digital certificate 506. The short-duration digital certificate 506 may specify the identity of the customer, a validity period for the short-duration digital certificate 506, a customer public cryptographic key, and a digital signature of the certificate authority service that issued the short-duration digital certificate to the customer server 502. In addition to this information, the short-duration digital certificate 506 may specify one or more extensions, which may be used to specify that the short-duration digital certificate 506 may be utilized for particular purposes. For instance, as illustrated in FIG. 5, the short-duration digital certificate 506 may include a "Basic Constraints" extension, which may be used to limit a path length for a certificate chain. While the "Basic Constraints" extension is used extensively throughout the present disclosure for the purpose of illustration, additional and/or alternative extensions may be specified within a short-duration digital certificate 506.

However, in contrast to the long-duration digital certificate illustrated in FIG. 4, the short-duration digital certificate 506 may not specify a critical "validation-only" extension, such as the "Validation_Only Type-1.01" extension specified within the long-duration digital certificate illustrated in FIG. 4. Thus, the short-duration digital certificate 506 may be recognized by the user client 504 and enable the user client 504 to utilize the short-duration digital certificate 506 to authenticate the customer server 502 and, through use of the certificate authority service's public cryptographic key, validate the certificate authority service digital signature specified within the short-duration digital certificate 506. Thus, if the user client 504 is able to authenticate the customer server 502 and verify that the short-duration digital certificate 506 is valid, the user client 504 may engage in further communications with the customer server 502 through a secure communications channel.

Figure 6:
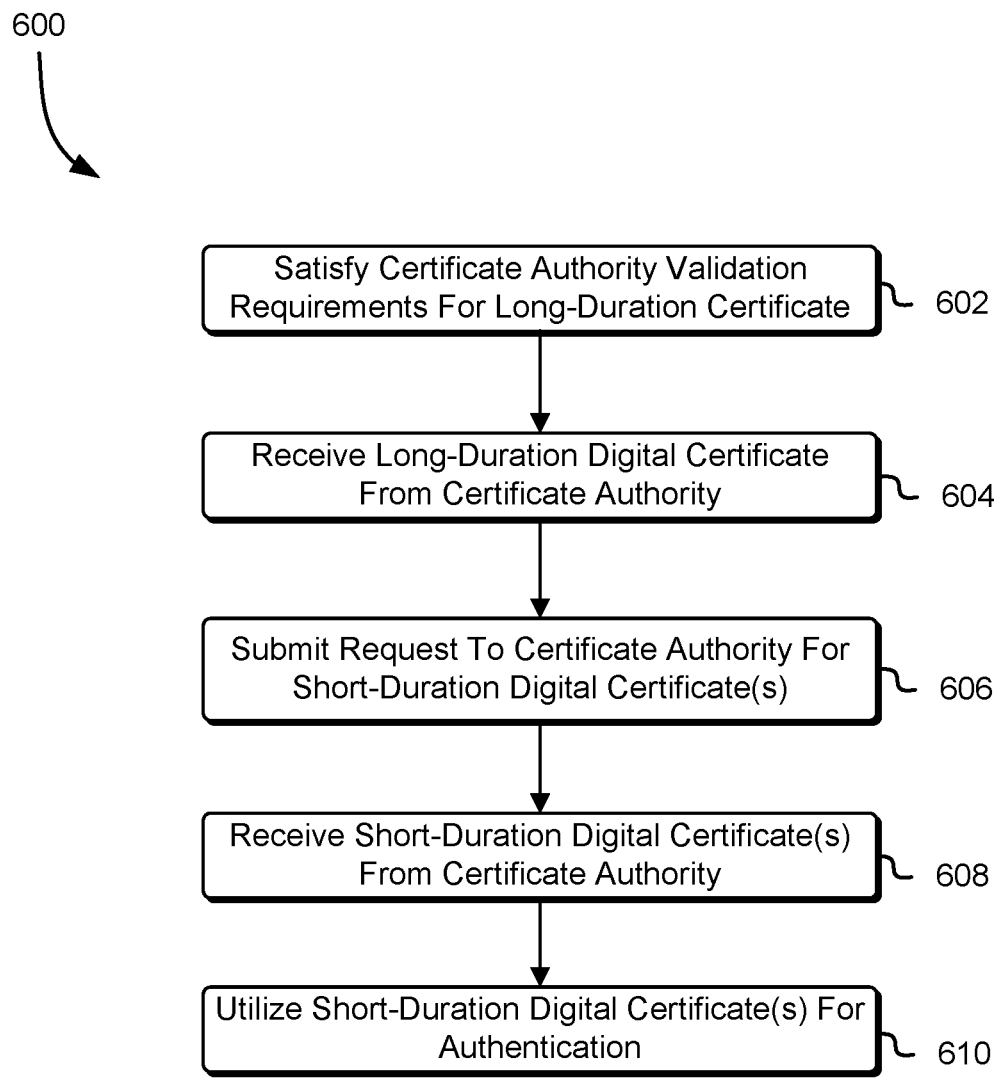
FIG. 6 shows as illustrative example of a process for receiving long-duration digital certificates and short-duration digital certificates from a certificate authority service in accordance with at least one embodiment.

As noted above, a customer may submit a request to a certificate authority service to request issuance of a long-duration digital certificate, which may be utilized only for validation purposes between the customer and the certificate authority service. Further, once the long-duration digital certificate has been issued to the customer, the customer may submit new requests to the certificate authority service for issuance of one or more short-duration digital certificates that may be used by user clients to authenticate the customer and enable secure communications between the customer and these user clients. The new requests for issuance of the one or more short-duration digital certificates may include the aforementioned long-duration digital certificate, which the certificate authority service may utilize to authenticate the customer and obtain information necessary to define the parameters of the short-duration digital certificates. Accordingly, FIG. 6 shows as illustrative example of a process 600 for receiving long-duration digital certificates and short-duration digital certificates from a certificate authority service in accordance with at least one embodiment. The process 600 may be performed by a customer through one or more customer servers, which may be configured to enable communications between the customer and the certificate authority service.

In order for a customer to obtain a long-duration digital certificate, the customer may be required to provide to the certificate authority service certain information that the certificate authority service may utilize to properly vet the customer as a trustworthy entity that may be entrusted with a long-duration digital certificate. For instance, the certificate authority service may access one or more databases maintained by government agencies, trusted third-party databases and other trusted information repositories to determine whether the customer may be trusted. Thus, the customer may be required to satisfy 602 one or more certificate authority service validation requirements in order to obtain a long-duration certificate.

If a customer is able to satisfy the certificate authority service validation requirements, the certificate authority service may generate a long-duration digital certificate. This long-duration digital certificate may specify a long validity period (e.g., one year or longer) and a particular critical extension that may specify that the long-duration digital certificate may only be used for validation purposes by the certificate authority service. Thus, the long-duration digital certificate may not be accepted by user clients that are configured to recognize this particular critical extension. Alternatively, the critical extension may not be recognized by a user client, which may cause the user client to reject the long-duration digital certificate. The validity period of the long-duration digital certificate may be defined by the certificate authority service or the customer through his/her request to the service. With the long-duration digital certificate generated, the certificate authority service may issue the long-duration digital certificate to the customer for use. Thus, the customer may receive 604 the long-duration digital certificate from the certificate authority service.

At any time after having received the long-duration digital certificate from the certificate authority service, the customer may submit 606 a request to the certificate authority service for issuance of one or more short-duration digital certificates that may be utilized for authentication purposes when communicating with one or more user clients. The request may include the aforementioned long-duration digital certificate, which the certificate authority service may utilize to verify the identity of the customer and ensure that the customer is authorized to obtain the requested one or more short-duration digital certificates. In an embodiment, the request submitted to the certificate authority service is digitally signed by the customer by utilizing the customer's private cryptographic key corresponding to a public cryptographic key specified within the long-duration digital certificate. The certificate authority service may use the public key of the long-duration certificate to verify the digital signature. This enables the certificate authority service to ensure that the short-duration digital certificates will be issued to the same entity that was issued the long-duration digital certificate previously.

Once the certificate authority service has validated the customer through use of the long-duration digital certificate, the certificate authority service may generate one or more short-duration digital certificates that may be issued to the customer. These short-duration digital certificates may have a shorter duration or validity period than the long-duration digital certificate. For instance, the certificate authority service may define the validity period for the short-duration digital certificates based at least in part on the remaining validation period for the long-duration digital certificate. Alternatively, the customer may request a particular validity period for these short-duration digital certificates, so long as the validity period is less than or equal to the remaining validation period for the long-duration digital certificate. This may prevent the certificate authority service from issuing a short-duration digital certificate that has an expiry date that is later than the expiry date of the long-duration digital certificate. The short-duration digital certificates may also omit the critical extension specified within the long-duration digital certificate. This may enable these short-duration digital certificates to be utilized by user clients to authenticate the customer. Once the short-duration digital certificates have been generated, the customer may receive 608 these short-duration digital certificates from the certificate authority service.

Once the customer has received the one or more short-duration digital certificates from the certificate authority service, the customer may utilize 610 these one or more short-duration digital certificates for authentication purposes. For instance, a customer server of the customer may provide user clients with a copy of a short-duration digital certificate to enable, for instance, the user clients to determine that they are communicating with a server authorized to operate on behalf of a domain name specified in the short-duration digital certificate. The short-duration digital certificate may include a certificate authority service digital signature, which may be validated by the user client through use of the public cryptographic key obtained from the certificate authority service and maintained by the user client, e.g., in a data storage location for trusted certificates. If the digital signature is validated, the user client may determine that the short-duration digital certificate is authentic and may be used to ensure that the customer is what it purports to be.

Figure 7:
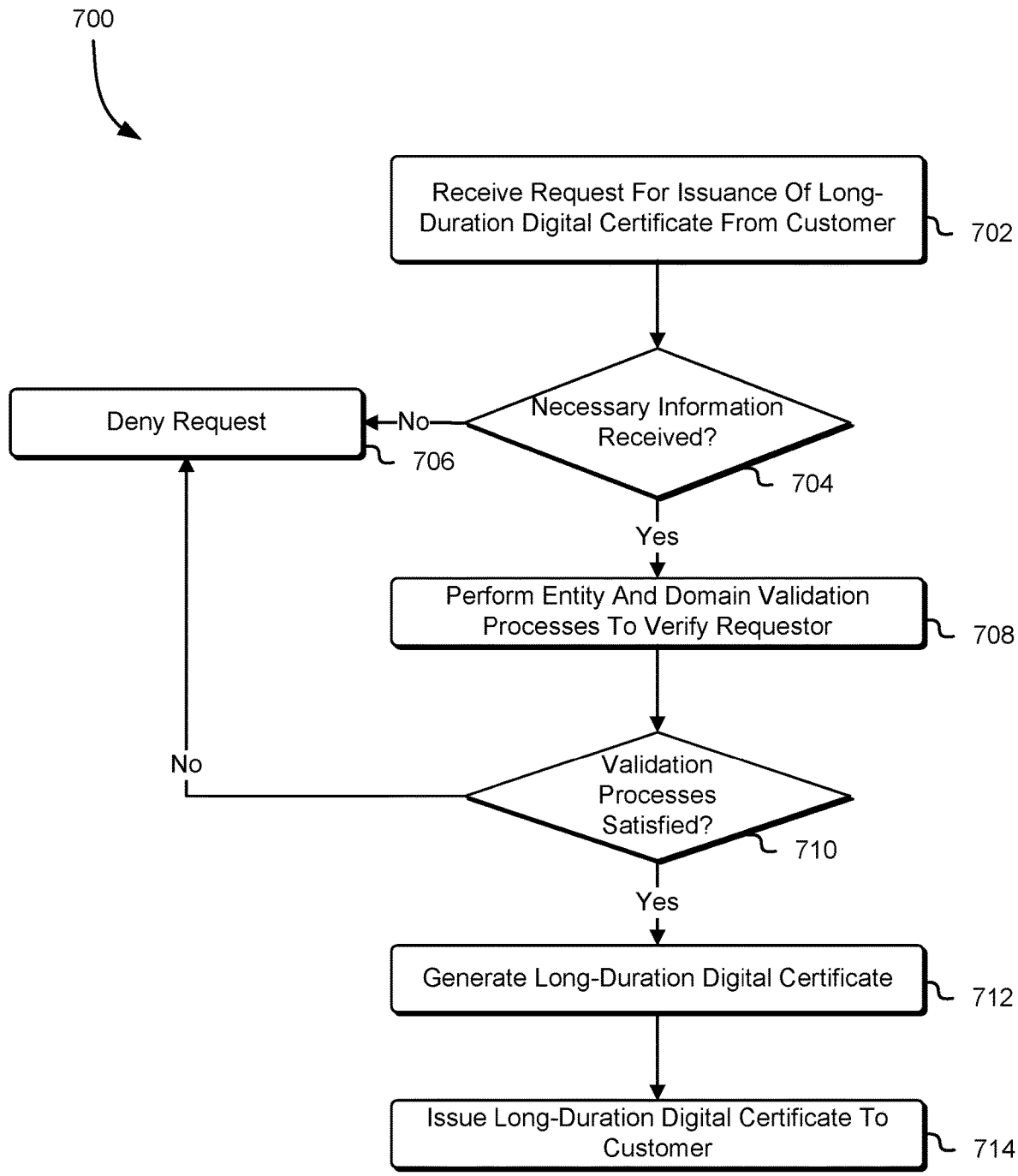
FIG. 7 shows an illustrative example of a process for generating and issuing a long-duration digital certificate in response to a customer request for issuance of the long-duration digital certificate in accordance with at least one embodiment.

As noted above, a certificate authority service may receive a request from a customer for issuance of a long-duration digital certificate. This long-duration digital certificate may be utilized for validation purposes between the customer and the certificate authority service. For instance, the long-duration digital certificate may specify a critical extension that may cause user clients to reject the digital certificate if provided to the user clients by the customer or any other entity. However, the certificate authority service may utilize this long-duration digital certificate to validate the customer and issue short-duration digital certificates that may be used for authentication upon request. Accordingly, FIG. 7 shows an illustrative example of a process 700 for generating and issuing a long-duration digital certificate in response to a customer request for issuance of the long-duration digital certificate in accordance with at least one embodiment. The process 700 may be performed by the aforementioned certificate authority service, which may be configured to receive requests from customers and communicate with other entities in order to determine whether a customer may be entrusted with long-term digital certificates. Further, the certificate authority service may be configured to generate these long-term digital certificates based at least in part on the customer's request and known digital certificate formats and standards.

A customer may communicate with a certificate authority service to request issuance of a long-duration digital certificate, which may be utilized for validation purposes between the customer and the certificate authority service. The customer may operate one or more servers, which may be utilized to communicate with various user clients during the course of business. In order for these one or more servers to be authenticated by these user clients and enable secure communications between these one or more servers and user clients, a customer may need to acquire one or more digital certificates in order to assure these user clients that the customer is what it purports to be. As noted above, the long-duration digital certificate is to be utilized for validation purposes. Additionally, this long-duration digital certificate may be required in order to obtain short-duration digital certificates that may be utilized for server authentication by the user clients. Thus, the certificate authority service may receive 702, from a customer, a request for issuance of a long-duration digital certificate.

The request from the customer may include information regarding the customer's business operations. For instance, the customer may provide its name, address, e-mail address, Uniform Resource Locator (URL), financial records and the like to the certificate authority service for review. This information may be necessary to determine whether the customer may be entrusted with one or more long-duration digital certificates. Thus, the certificate authority service may determine 704 whether it has received the necessary information from the customer to perform a thorough validation process for vetting the customer. If the customer has not supplied this necessary information, as required by the certificate authority service, the certificate authority service may deny 706 the customer's request for issuance of a long-duration digital certificate.

If the customer has supplied the certificate authority service with the necessary information required to validate the customer, the certificate authority service may perform 708 one or more entity and domain validation processes to verify and validate the requestor (e.g., customer). For instance, in some embodiments, the certificate authority service may send one or more electronic mail (e-mail) messages to an address that is known as being administratively responsible for the customer's domain. The certificate authority service, for example, may utilize a "WHOIS" query to identify the customer domain and transmit an authentication link to the specified contact address included in the customer's "WHOIS" entry. Additionally, or alternatively, the certificate authority service may access various government agency databases and other third-party databases to determine, based at least in part on the provided information, whether the customer may be entrusted with a long-duration digital certificate.

Once the certificate authority service has performed the entity and domain validation processes, the certificate authority service may determine 710 whether these processes have been satisfied. For instance, if the certificate authority service determines, based on an analysis of customer information specified within government agency databases and other third-party databases that the customer may not be entrusted with a long-duration digital certificate, the certificate authority service may deny 706 the customer's request. However, if the validation processes have been satisfied, the certificate authority service may generate 712 a long-duration digital certificate that may be utilized for validation purposes between the certificate authority service and the customer.

The long-duration digital certificate may specify the issuer of the digital certificate, the validity period for the certificate, the subject (e.g., customer), the subject's public cryptographic key, and the digital signature of the certificate authority service. The long-duration digital certificate may further specify a critical extension that may indicate that the long-duration digital certificate is to be utilized only for validation purposes. This critical extension may not be recognized by some user clients and, as a result, may be automatically rejected by these user clients. Alternatively, the user clients may be configured to reject any digital certificates that include this critical extension. Once the certificate authority service has generated this long-duration digital certificate, the certificate authority service may issue 714 this certificate to the customer. Thus, the customer may now utilize this long-duration digital certificate for validation purposes and as part of a request to obtain short-duration digital certificates for communications with one or more user clients.

Figure 8:
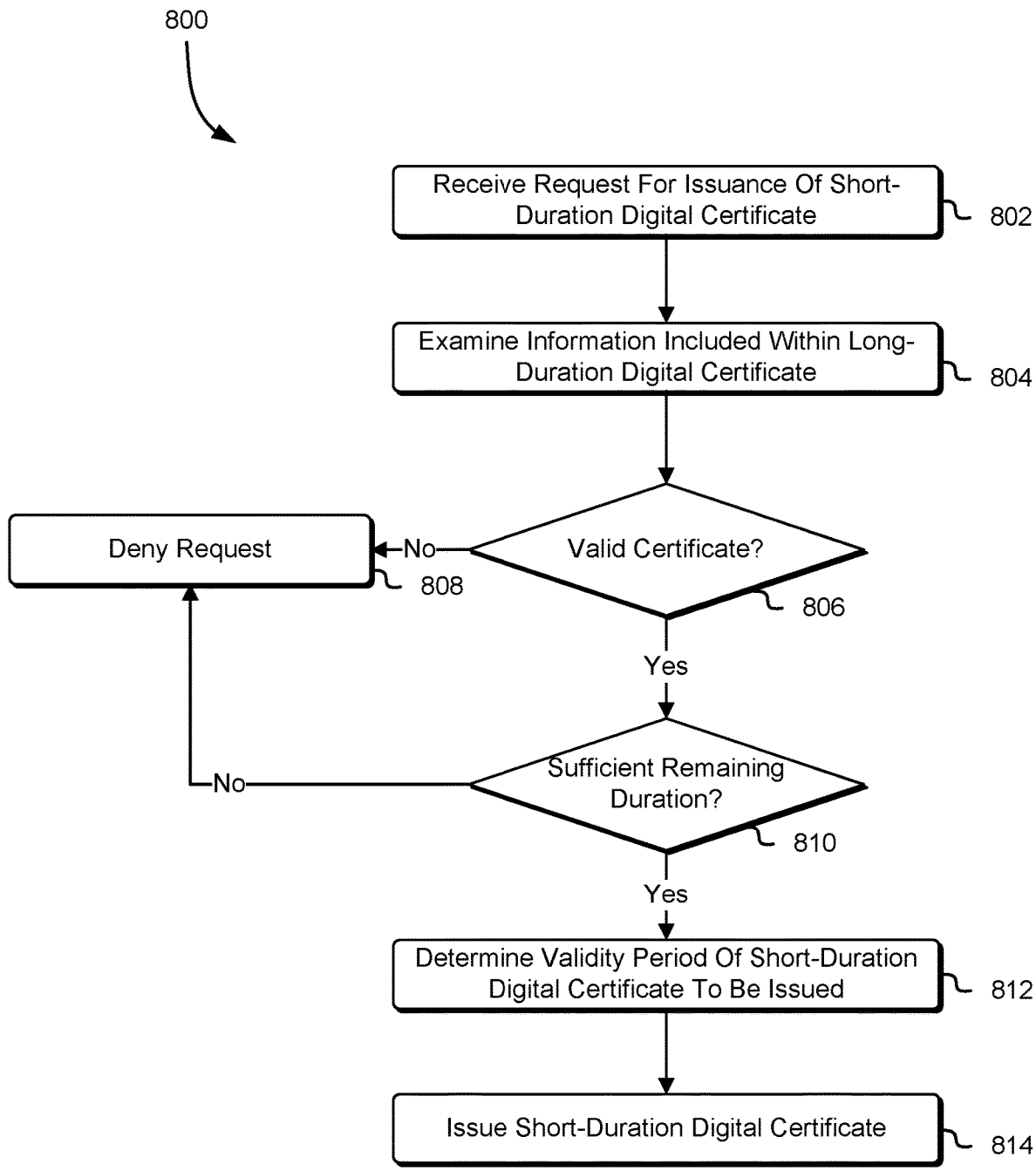
FIG. 8 shows an illustrative example of a process for utilizing a long-duration digital certificate to authenticate a customer and issue one or more short-duration digital certificates in response to a customer request in accordance with at least one embodiment.

As noted above, a certificate authority service may receive a request from a customer for issuance of one or more short-duration digital certificates. These one or more short-duration digital certificates, as opposed to the previously issued long-duration digital certificate, may be utilized by user clients to authenticate the customer and enable secure communications between the customer and these user clients. The request from the customer may include the previously issued long-duration digital certificate, which may be utilized by the certificate authority service to validate the customer and to obtain information necessary for generating the requested short-duration digital certificates. Accordingly, FIG. 8 shows an illustrative example of a process 800 for utilizing a long-duration digital certificate to authenticate a customer and issue one or more short-duration digital certificates in response to a customer request in accordance with at least one embodiment.

Similar to the process 700 described above, a customer may communicate with a certificate authority service to request issuance of a short-duration digital certificate, which may be provided to user clients by the customer to enable these user clients to authenticate the customer and transmit secure communications to the customer. The request may include the long-duration digital certificate previously issued to the customer by the certificate authority service and usable only for validation purposes between the customer and the certificate authority service. In some embodiments, the request for issuance of short-duration digital certificates may be digitally signed using the customer's private cryptographic key included within the long-duration digital certificate in order to assure the certificate authority service that the short-duration digital certificates will be issued to the customer. The certificate authority service may use the public cryptographic key of the long-duration digital certificate to verify the digital signature. Thus, the certificate authority service may receive 802 a request for issuance of one or more short-duration digital certificates.

Once the certificate authority service has received the request for issuance of the one or more short-duration digital certificates from the customer, the certificate authority service may examine 804 information included within the long-duration digital certificate to determine 806 whether the certificate is valid. For instance, the certificate authority service may evaluate the subject fields within the long-duration digital certificate to determine whether the entity submitting the request matches the specified subject within the long-duration digital certificate. Further, the certificate authority service may determine whether the long-duration digital certificate has been tampered with by utilizing the included certificate authority service digital signature to determine the validity of the certificate. If the certificate authority service determines that the long-duration digital certificate is not valid, the certificate authority service may deny 808 the customer's request for issuance of the short-duration digital certificate.

In an embodiment, the long-duration digital certificate may be issued by a different certificate authority service than the certificate authority service configured to issue the short-duration digital certificates to the customer. The long-duration digital certificate may include a certificate authority service digital signature corresponding to this different certificate authority service. Accordingly, the certificate authority service may first determine whether it has a public cryptographic key from this different certificate authority service and, if so, utilize this public cryptographic key to verify the digital signature specified within the long-duration digital certificate and validate the long-duration digital certificate. If the long-duration digital certificate is valid, the certificate authority service may continue examining the long-duration digital certificate to determine whether it can issue the requested short-duration digital certificates to the customer.

If the certificate authority service determines that the long-duration digital certificate is indeed valid, the certificate authority service may determine 810 whether the long-duration digital certificate still has a sufficient remaining validation period for issuance of the short-duration digital certificates. For instance, the certificate authority service may require that a long-duration digital certificate must have a remaining validation period greater than three months in order for the certificate authority service to issue any short-duration digital certificates based on the long-duration digital certificate. Similarly, the certificate authority service may be configured to only issue short-duration digital certificates with a particular validity period. If this particular validity period exceeds the remaining validation period of the long-duration digital certificate, the certificate authority service may not be permitted to generate the requested one or more short-duration digital certificates. Thus, if the certificate authority service determines that the long-duration digital certificate does not have a sufficient remaining validation period, the certificate authority service may deny 808 the customer's request.

Once the certificate authority service has determined that the long-duration digital certificate has a sufficient remaining validation period for issuance of the requested one or more short-duration digital certificates, the certificate authority service may determine 812 the validity period of the short-duration digital certificates to be issued. As noted above, the certificate authority service may be configured to generate short-duration digital certificates with a set validity period. Thus, these short-duration digital certificates may specify this particular validity period. In other embodiments, a customer, through the request, may specify a desired validity period for the short-duration digital certificates. If the desired validity period does not exceed the remaining validation period for the long-duration digital certificate, the certificate authority service may utilize this desired validity period to calculate the start date and expiry date of the requested one or more short-duration digital certificates.

The certificate authority service may utilize the determined validity period of the short-duration digital certificates and information garnered from the long-duration digital certificate to generate the one or more short-duration digital certificates. Subsequently, the certificate authority service may issue 814 the one or more short-duration digital certificates to the customer in response to his/her request. This may enable the customer to provide these one or more short-duration digital certificates to various user clients to enable these user clients to authenticate the customer and securely communicate with the customer.

Figure 9:
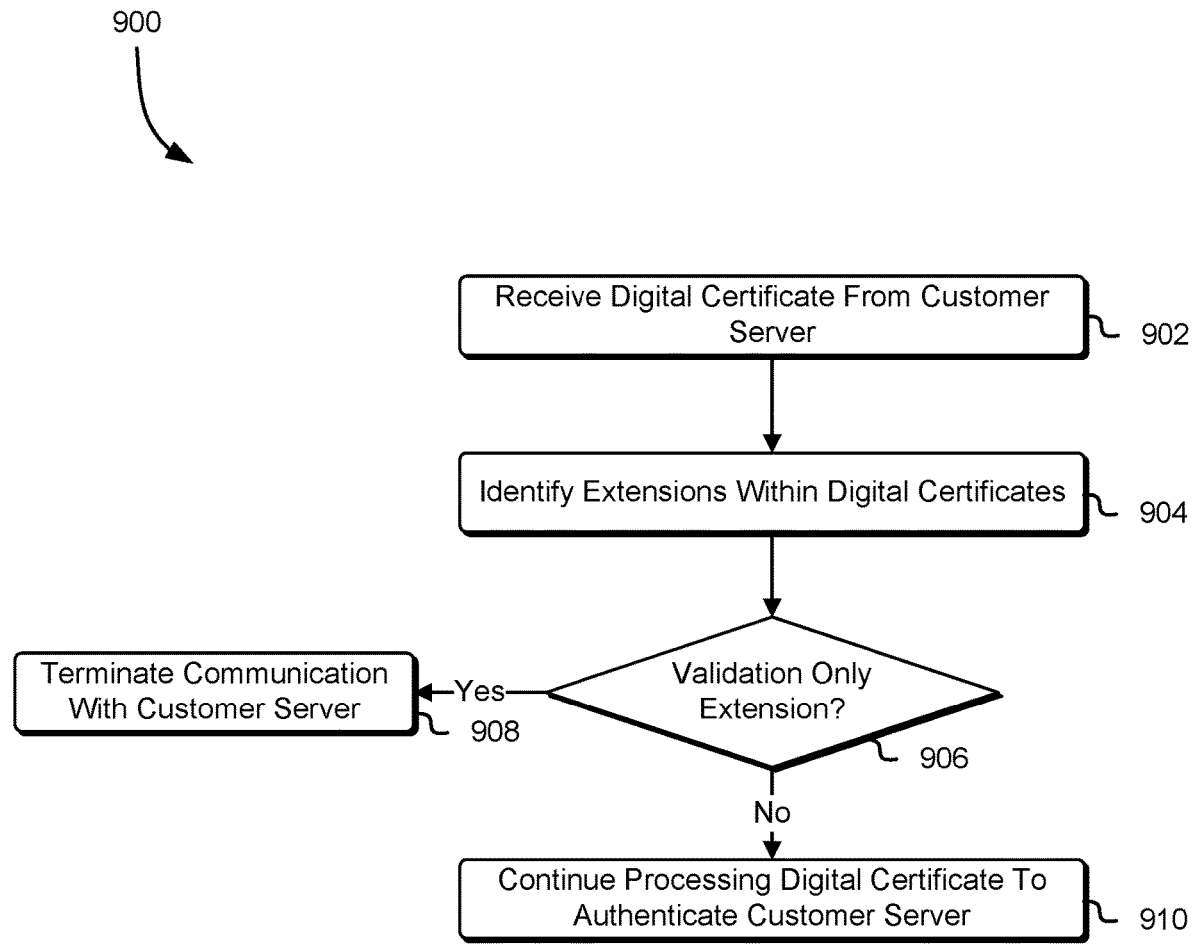
FIG. 9 shows an illustrative example of a process for utilizing a digital certificate to authenticate a customer server in accordance with at least one embodiment.

As noted above, the long-duration digital certificate may include a critical extension that may either not be recognized by a user client or may cause the user client, upon detection and recognition of this extension, to not accept the long-duration digital certificate. Thus, if a customer provides a long-duration digital certificate to a user client, the user client may not be able authenticate the customer and thus not communicate further with the customer. Accordingly, FIG. 9 shows an illustrative example of a process 900 for utilizing a digital certificate to authenticate a customer server in accordance with at least one embodiment. The process 900 may be performed by any user client, such as a browser application installed on a user's computing device.

When a user client establishes a communications channel with a customer server, the customer server may transmit one or more digital certificates to the user client in order to establish the customer server's identity. These digital certificates may include various fields which may be used to determine whether the customer server is who it purports to be. For instance, the digital certificate may include a subject field, which may specify the name, address and domain of the customer and the associated customer server. Further, the digital certificate may include a certificate authority service digital signature, which the user client may utilize to verify that the digital certificate was issued by a trusted certificate authority service and that the digital certificate is valid. Further, the digital certificate may include various extensions, which may specify how the digital certificate should be processed by the user client. Thus, upon establishing a communications with a customer server, the user client may receive 902 a digital certificate from this customer server and may further identify 904 any extensions specified within the digital certificate.

As noted above, long-duration digital certificates may include a critical extension that may specify that the long-duration digital certificate may only be utilized for validation purposes between the customer server and the issuing certificate authority service. This critical extension may not be recognized by certain user clients and, as a result, may cause these user clients to reject the long-duration digital certificates. Alternatively, in some embodiments, a user client may be configured to recognize this critical extension and, as a result, not accept the long-duration digital certificate from the customer server. Thus, the user client may determine 906 whether the received digital certificate includes this "validation only" critical extension. If the digital certificate includes this critical extension, the user client may terminate 908 the communications channel between the user client and the customer, as the user client may be unable to authenticate the customer. However, if the critical extension is not present, the user client may continue 910 processing the digital certificate to authenticate the customer server.

Figure 10:
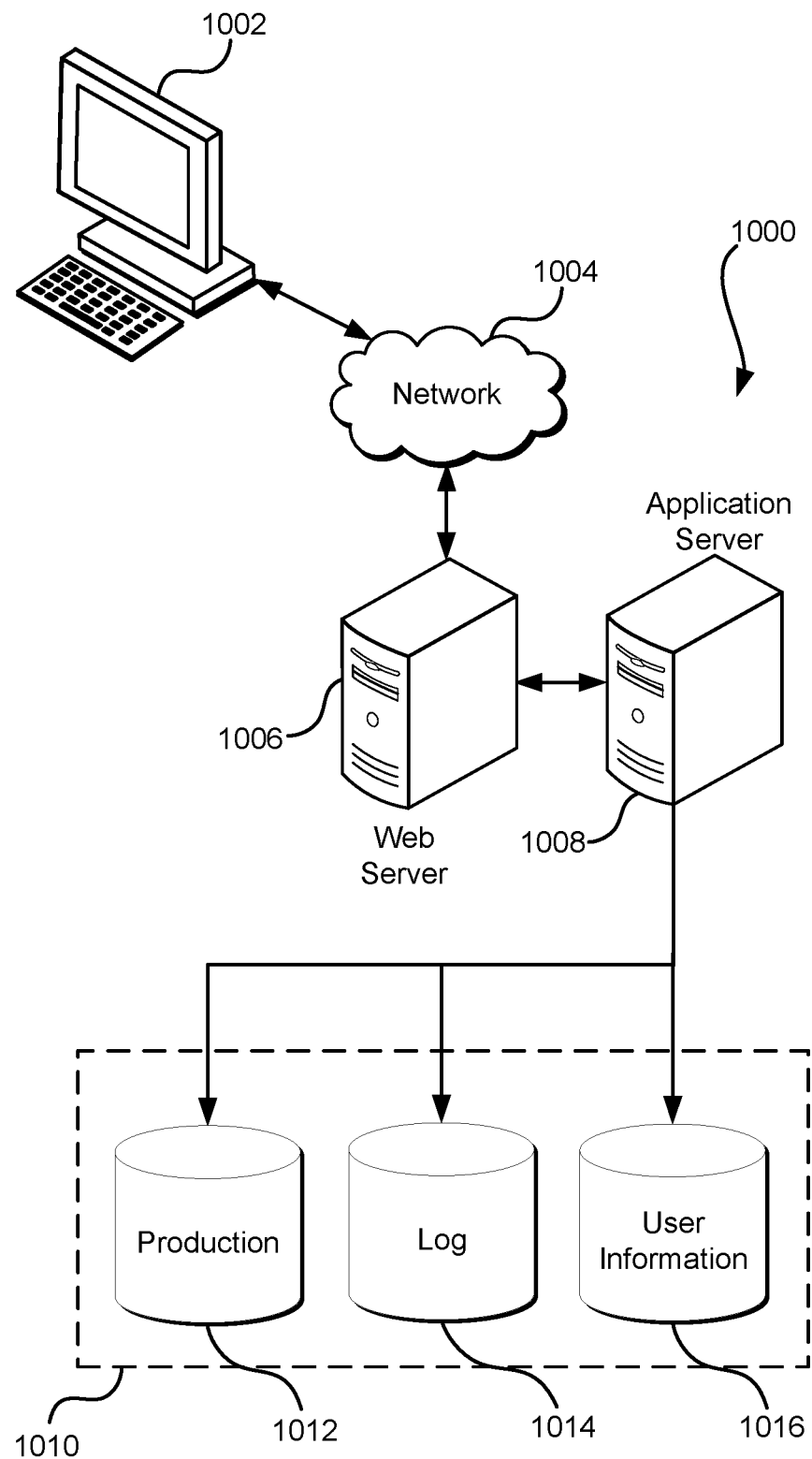
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP:

Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java °, C, C #or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
receiving, from an entity, a request to issue a second, short-duration, digital certificate usable for authentication of a server of the entity, the request including a first, long-duration, digital certificate that is not usable for authentication of a server of the entity;
determining, based at least in part on a first validity period specified in the first digital certificate, whether to issue the second digital certificate; and
issuing the second digital certificate with a second validity period, specified in the second digital certificate, that is shorter than the first validity period, wherein a second expiration date of the second validity period is the same or earlier than a first expiration date of the first validity period.

2. The computer-implemented method of claim 1, wherein:
the request includes a digital signature; and
the method further comprises verifying the digital signature using a first public cryptographic key specified by the first digital certificate.

3. The computer-implemented method of claim 1, further comprising using the first validity period to verify that the first digital certificate has not expired and can be utilized for issuance of the second digital certificate.

4. The computer-implemented method of claim 1, wherein the second digital certificate is issued to have one or more subject fields not included within the first digital certificate.

5. A system, comprising one or more processors, and memory that stores computer-executable instructions that, when executed, cause the one or more processors to:
receive, from an entity, a request to issue a second, short-duration, digital certificate usable for authentication of a server of the entity, the request including a first, long-duration, digital certificate that is not usable for authentication of a server of the entity;
determine, based at least in part on a first validity period specified in the first digital certificate, whether to issue the second digital certificate; and
issue the second digital certificate to have a second validity period, specified in the second digital certificate, that is shorter than the first validity period, wherein a second expiration of the second validity period is the same or earlier than a first expiration of the first validity period.

6. The system of claim 5, wherein the first digital certificate further specifies a critical extension specifying a date of validation of an entity prior to issuance of the first digital certificate, one or more standards usable to validate the entity, and an identifier corresponding to the entity.

7. The system of claim 5, wherein the second digital certificate comprises one or more subject fields not specified in the first digital certificate.

8. The system of claim 5, wherein the first digital certificate specifies a first public cryptographic key that corresponds to a first private cryptographic key.

9. The system of claim 8, wherein the request is digitally signed utilizing the first private cryptographic key corresponding to the first public cryptographic key.

10. The system of claim 8, wherein the second digital certificate includes a second public cryptographic key that is distinct from the first public cryptographic key specified in the first digital certificate.

11. The system of claim 5, wherein the first digital certificate is an X.509 digital certificate.

12. A non-transitory computer-readable storage medium having stored thereon executable instructions that, as a result of being executed by one or more processors of a computer system, cause the computer system to at least:
determine, in response to a request to issue a second, short-duration, digital certificate being usable for authentication of a server of an entity, and based at least in part on a first validity period specified in a first, long-duration, digital certificate included in the request, said first digital certificate not being usable for authentication of a server of the entity, whether to issue the second digital certificate; and
issue the second digital certificate to have a second validity period, specified in the second digital certificate, that is shorter than the first validity period, wherein a second expiration date of the second validity period is the same or earlier than a first expiration date of the first validity period.

13. The non-transitory computer-readable storage medium of claim 12, wherein the first digital certificate further specifies a critical extension specifying a date of validation of an entity prior to issuance of the first digital certificate, one or more standards usable to validate the entity, and an identifier corresponding to the entity.

14. The non-transitory computer-readable storage medium of claim 12, wherein the second digital certificate includes one or more subject fields that are not included within the first digital certificate.

15. The non-transitory computer-readable storage medium of claim 12, wherein the executable instructions further cause the computer system to obtain a desired second validity period defined by the entity within the request to determine whether to issue the second digital certificate.

16. The non-transitory computer-readable storage medium of claim 12, wherein the request to issue the second digital certificate includes the first digital certificate.

17. The non-transitory computer-readable storage medium of claim 12, wherein:
the request includes a digital signature; and
the executable instructions further cause the computer system to verify the digital signature using a public cryptographic key specified within the first digital certificate.

18. The non-transitory computer-readable storage medium of claim 12, wherein the second digital certificate includes a second public cryptographic key that is distinct from the public cryptographic key specified within the first digital certificate.

19. The non-transitory computer-readable storage medium of claim 12, wherein the second digital certificate includes one or more subject fields that are distinct from a set of subject fields included in the first digital certificate.

20. The non-transitory computer-readable storage medium of claim 12, wherein the executable instructions further cause the computer system to determine using the first validity period to verify that the first digital certificate has not expired and can be utilized for issuance of the second digital certificate.

* * * * *